(12) United States Patent
Johnson

(10) Patent No.: US 6,469,638 B1
(45) Date of Patent: Oct. 22, 2002

(54) INTRA-VEHICLE COMMUNICATIONS SYSTEM IN A MINING VEHICLE MONITORING SYSTEM

(75) Inventor: Lyle V. Johnson, Tucson, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 0 days.

(21) Appl. No.: 09/677,523

(22) Filed: Sep. 30, 2000

(51) Int. Cl.$^7$ .............................................. G08B 21/00
(52) U.S. Cl. ........................... 340/870.16; 340/870.07; 340/559; 340/438; 701/29; 702/188
(58) Field of Search ................................ 340/445, 438, 340/425.5, 531, 539, 870.07, 870.1; 701/102, 115, 29; 702/188

(56) References Cited

U.S. PATENT DOCUMENTS

| | | | | |
|---|---|---|---|---|
| 4,398,172 A | * | 8/1983 | Carroll | 340/942 |
| 5,341,130 A | | 8/1994 | Yardley et al. | 340/3.1 |
| 5,646,844 A | | 7/1997 | Gudat et al. | 701/208 |
| 5,815,071 A | * | 9/1998 | Doyle | 340/439 |
| 5,995,898 A | * | 11/1999 | Tuttle | 701/102 |
| 6,167,333 A | * | 12/2000 | Gehlot | 701/35 |

OTHER PUBLICATIONS

Abstract of Japan Patent Application No. 05005382, Filed Feb. 21, 1995, entitled Intra Vehicle Communication System.

Specifications for Model TR1000 916.50 Mhz Hybrid Transceiver sold by RF Monolithics, Inc. , 4347 Signma Road, Dallas Tx 75244.

Product Information for Furukawa Electric Co.'s Automotive LAN system "Palmnet".

Product information for Chrystler's intra-vehicle communications system (SAEJ1850).

* cited by examiner

Primary Examiner—Michael Horabik
Assistant Examiner—Albert K. Wong
(74) Attorney, Agent, or Firm—Birdwell Janke & Durando, PLC

(57) ABSTRACT

An intra-vehicle communications system in a mining vehicle monitoring system. A status sensor, status radio transmitter and power source are located adjacent to a portion or component of the vehicle to be monitored and a status radio receiver is located adjacent to a vehicle-to-base transmitter that receives a status radio signal from the status radio transmitter and forwards that signal to a base station at a central monitoring location. Preferably a plurality of such sensors, status radio transmitters and respective power sources are distributed throughout the vehicle. The status radio transmitters are relatively low power devices which require relatively low power for operation. Preferably the vehicle-to-base radio operates at a different frequency from the intra-vehicle status radios so as to avoid mutual interference. In many cases the power sources obtain their power from the motion of the vehicle itself.

14 Claims, 6 Drawing Sheets

INTRA-VEHICLE COMMUNICATIONS SYSTEM IN A MINING VEHICLE MONITORING SYSTEM

BACKGROUND OF THE INVENTION

This invention relates to systems and methods for monitoring the status of mining vehicles, and particularly to an intra-vehicle radio data communication system.

In mining operations it is useful to monitor continuously the location and status of mining vehicles, such as extraordinarily large load-hauling dump trucks, commonly known as "haul trucks." Such vehicles are typically operated twenty-four hours a day, seven days a week, except as needed to change drivers, refuel and perform maintenance. Under such operating conditions, it is desirable to monitor the position and status of the vehicle continuously so as to achieve maximum efficiency and determine when maintenance is required.

Mining vehicle monitoring systems typically comprise a central monitoring and control location having a base radio transceiver for data communication with many mining vehicles, and respective transceivers mounted on the vehicles for transmitting to the base station data representative of the status and location of the vehicles, and for receiving control signals from the base station. A system of this type is shown, for example, in Gudat et al. U.S. Pat. No. 5,646,844 entitled METHOD AND APPARATUS FOR REAL-TIME MONITORING AND COORDINATION OF MULTIPLE GEOGRAPHY ALTERING MACHINES ON A WORK SITE, hereby incorporated by reference in its entirety.

Mining vehicles operate in a harsh environment, and rock, dirt and ore being processed using such vehicles tends to strike many parts of the exterior of the vehicle frequently. While it is desirable to monitor the status of many components on the vehicle, such as tire pressure, tire temperature, fuel, lubrication level, shaft speeds and the like, wires for providing power to and receiving data from sensors and other status indicators distributed throughout the vehicle need to be heavily protected to prevent damage. Such protection adds undesirable weight and complexity to the design of the vehicle.

Therefore, there is a need for a practical system and method for determining the status of various components of a mining vehicle in mining vehicle monitoring systems.

SUMMARY OF THE INVENTION

The present invention satisfies the aforementioned need by providing the combination of a status sensor, status radio transmitter and power source located adjacent to a portion or component of the vehicle to be monitored, and a status radio receiver located adjacent to a vehicle-to-base transmitter that receives a status radio signal from the status radio transmitter and forwards that signal to a base station at a central monitoring location. Preferably, a plurality of such sensors, status radio transmitters and respective power sources are distributed throughout the vehicle. The status radio transmitters are low power devices. Preferably the vehicle-to-base radio operates at different frequencies from the intra-vehicle status radios so as to avoid mutual interference. In particular embodiments, the power sources obtain their power from the motion of the vehicle itself.

Accordingly, it is a principal object of the present invention to provide a novel system and method for intra-vehicle communication in a mining vehicle monitoring system.

It is another object of the present invention to provide an intra-vehicle radio communication system for monitoring the status of various vehicle components.

It is a further object of the present invention to provide status radio transmitters in an intra-vehicle communication system wherein the transmitters are powered by the motion of the vehicle.

The foregoing and other objects, features and advantages of the present invention will be more readily understood upon consideration of the following detailed description of the invention, taken in conjunction with the accompanying drawings.

DETAILED DESCRIPTION OF THE INVENTION

Figure 1:
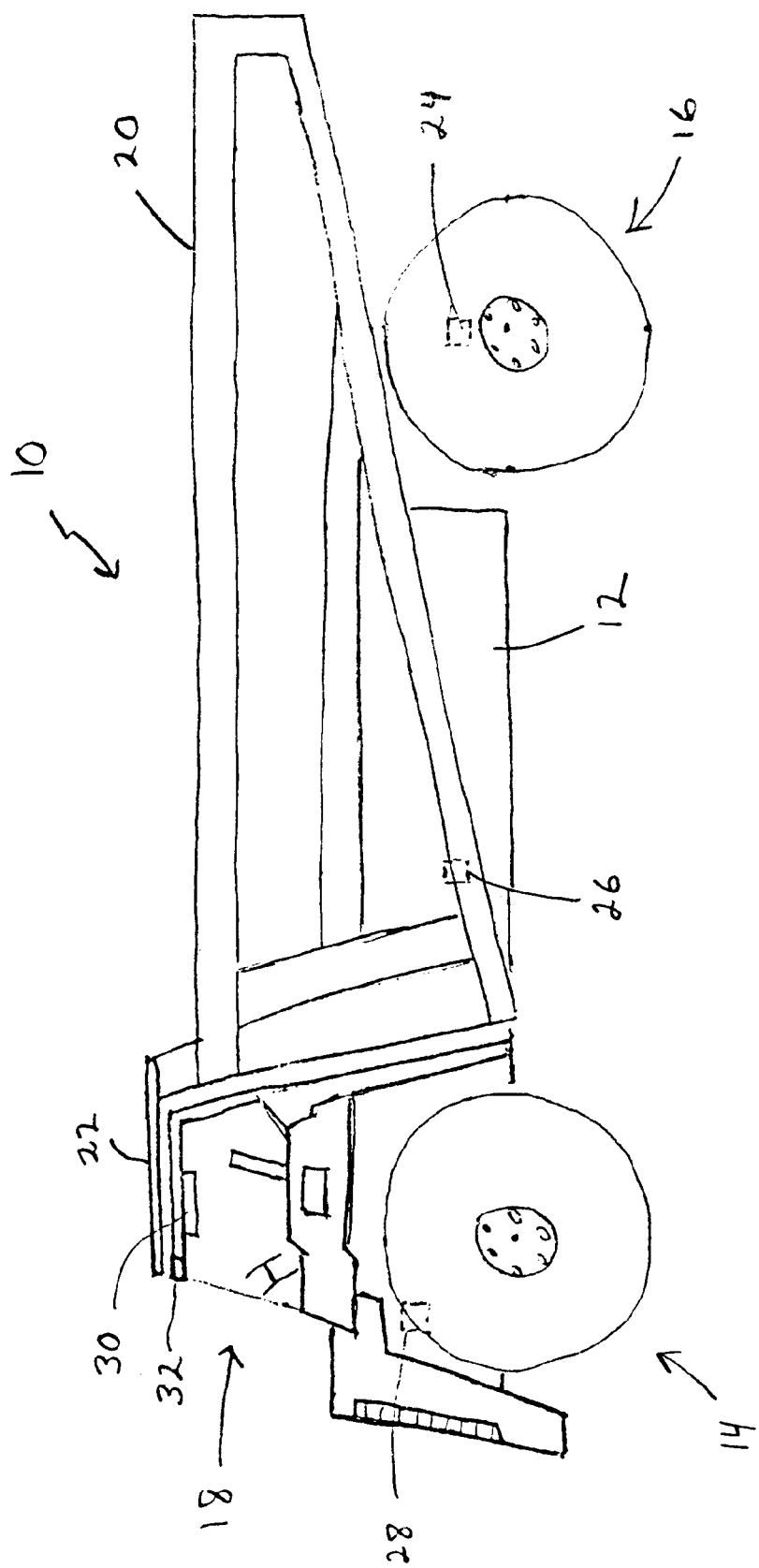
FIG. 1 is a side elevation of a typical mining vehicle, specifically a haul truck used in a mining operation, showing status monitoring devices disposed at various locations on the vehicle according to the present invention.

A typical mining vehicle is a haul truck 10, as shown in FIG. 1. Such a truck would ordinarily have a frame 12, front wheels 14 for steering, rear wheels 16 that are driven, a cab 18, and a material container 20 for receiving ore, rocks, and dirt to be moved from one location to another. The truck ordinarily would include a cab guard 22 (commonly known as a "headache rack") disposed over the cab 18 to prevent rocks and other heavy material from striking the cab and endangering the operator. Such trucks are often used in open-pit mines where they must travel a considerable distance from within the pit where they receive material to a location outside the pit where they deposit that material, and back, twenty-four hours a day, seven days a week. The present invention is particularly adapted for use with such a haul truck, but is not limited thereto and may be used with other types of mining equipment such as, for example, a drill or an excavator, which are meant to be contemplated by the term "vehicle" as used herein, even though they may not have wheels and might ordinarily be used at a fixed location.

The present invention contemplates that various types of monitoring devices are distributed throughout a mining vehicle to monitor its components. By way of example, but not limitation, a tire-pressure monitoring device 24 may be disposed at the rear tires (as well as the front tires), a speed monitoring device 26 may be disposed at the drive shaft, and an engine temperature monitoring device 28 may be mounted at the engine. Other examples of monitoring devices which might be used, again without limiting the scope of the invention, are a tire temperature transducer, a fuel gauge or volumetric fuel flow meter, and devices for producing quantities derived from direct parameter measurements. In accordance with the invention, a respective status radio transmitter is associated with each of these monitoring devices and transmits a status radio signal to a central control unit 30, which includes a status radio receiver, preferably mounted in the cab 18 of the vehicle. Also, each of the status radio transmitters receives its power from a local source associated with the respective monitoring device, which may produce power from the motion of the vehicle. The central control unit 30 includes a vehicle-to-base radio transmitter which receives status data from the status radio receiver and transmits it to a base station via antenna 32.

Figure 2:
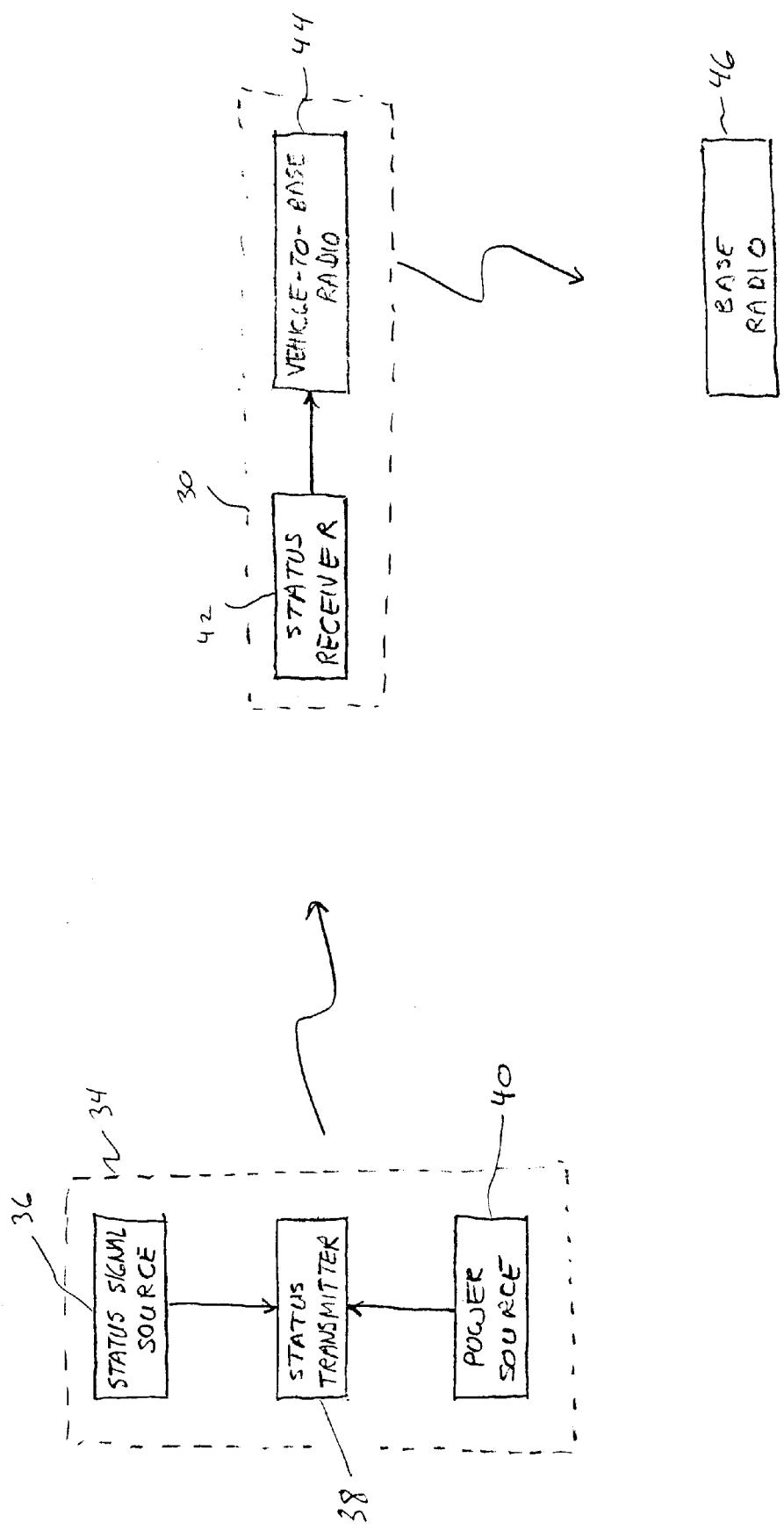
FIG. 2 is a block diagram of a generic intra-vehicle communication system in a mining vehicle monitoring system according to the present invention.

Turning to FIG. 2, as well as FIG. 1, a typical monitoring device 34 preferably includes a status signal source 36, a status radio transmitter 38, and a power source 40. The status signal source may be any number of devices, for example, a pressure sensor, a fluid level sensor, a temperature sensor, a speed sensor or a switch. In any case, it produces a data signal representative of a vehicle component parameter which is provided to the status radio transmitter 38. Power is supplied to the status radio transmitter by the power source 40, which may be any number of devices. For example, the power source may be an electric generator driven by a rotating shaft or a vibrating element of the vehicle, a solar cell, the status signal source itself, an energy storage device such as a battery, or a local electrical device. What is generally important is that the power source is localized so as to obviate the need for wiring from another location to supply power to the status radio transmitter 38 or status signal source 36. In more specific embodiments of the invention, as explained hereafter, it is also important that the motion of the vehicle itself generate the power.

The status radio transmitter 38 transmits a status radio signal to a status radio receiver 42 included within the central control unit 30. The status data is transferred to a vehicle-to-base radio 44, which transmits that data to a base radio 46. Preferably, the radio transmission frequencies employed are microwave frequencies, but other frequency bands may be used without departing from the principles of the invention. Also, preferably, the frequencies on which the base station radio and vehicle-to-base station communicate are different from those on which the status radio transmitter communicates with the status radio receiver so as to avoid interference. However, it is to be recognized that the same frequencies might be used if some other means of avoiding interference is employed, such as time-division multiplexing for example.

An important consideration is the power level required to operate the status radio transmitter 38. The invention contemplates that a relatively low power output transmitter is used because relatively low power output is adequate for the relatively short distances presented by intra-vehicle communications, and because relatively low input power can be provided by localized power generators. One product which has been found particularly suitable for this application is a Model TR1000 916.50 Mhz Hybrid Transceiver sold by RF Monolithics, Inc., located at 4347 Sigma Road, Dallas, Tex. 75244. This device is particularly suitable because it provides as much as about 0.77 milliwatts of output power while drawing about 36 milliwatts of input power at 3 volts DC. However, it is to be recognized that other devices may be used for the status radio transmitter without departing from the principles of the invention.

Figure 3:
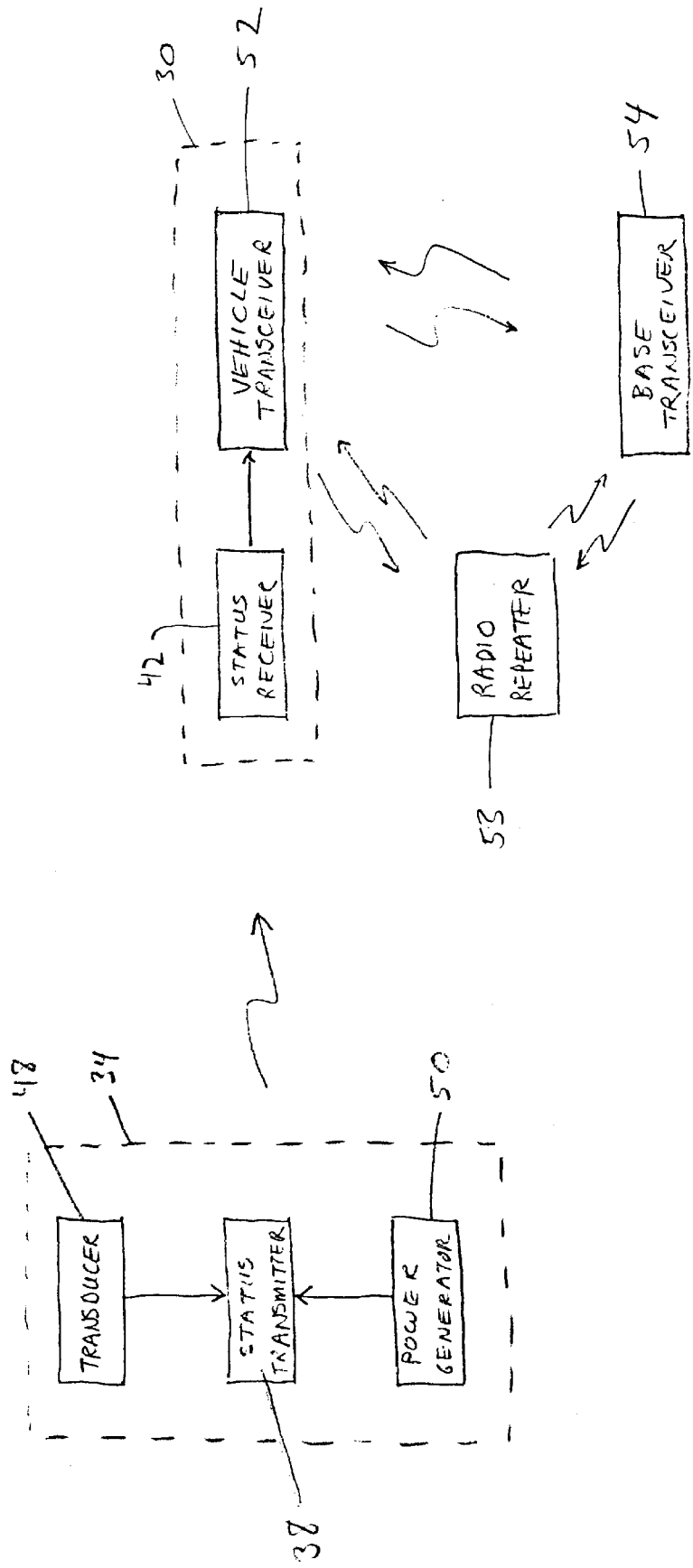
FIG. 3 is a block diagram of variations of the intra-vehicle communication system shown in FIG. 2.

Some specific variations to an intra-vehicle communications system within a mining vehicle monitoring system in accordance with the present invention are shown in FIG. 3. Thus, the status signal generator is shown specifically to be a transducer 48, and the power source is shown specifically to be a power generator 50. Further, the vehicle-to-base radio transmitter is shown to be a radio transceiver 52, and the base radio is also shown to be a transceiver 54, so not only may status data signals be sent to the base station, but control and interrogation signals may be sent from the base station to the vehicle. Also, in some cases the vehicle may communicate with the base station through one or more radio repeaters 53, as shown in FIG. 3. Some or all of these variations may be used in any given mining vehicle monitoring system.

Figure 4:
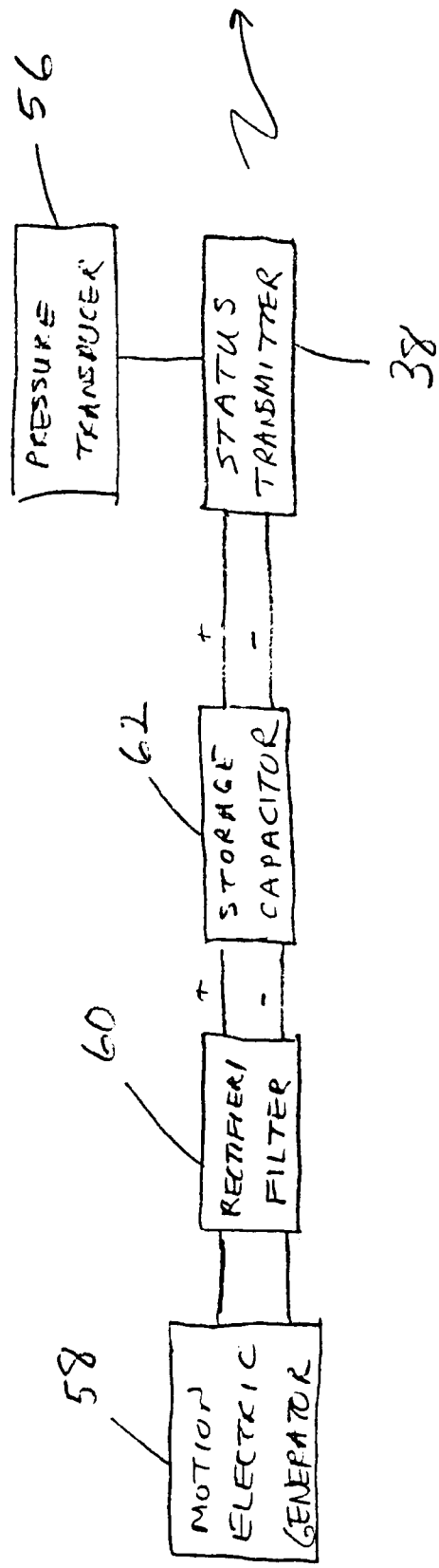
FIG. 4 is a block diagram of a combination of a pressure transducer, status radio transmitter and motion power source according to the present invention.

A more specific embodiment of the monitoring device 34 is shown in FIG. 4. In this embodiment the status signal generator is a pressure transducer 56, for example a tire pressure gauge that produces an electrical signal representative of tire pressure. Such a device might be employed at both of the rear wheels 16 of a haul truck 10, for example. To provide local power for the status radio transmitter 38 a motion electric generator 58 is provided to produce a small, varying current from the movement of the vehicle itself. The current is rectified by rectifier 60 and fed to an energy storage device 62 to provide DC power to the status radio transmitter 38.

Figure 5:
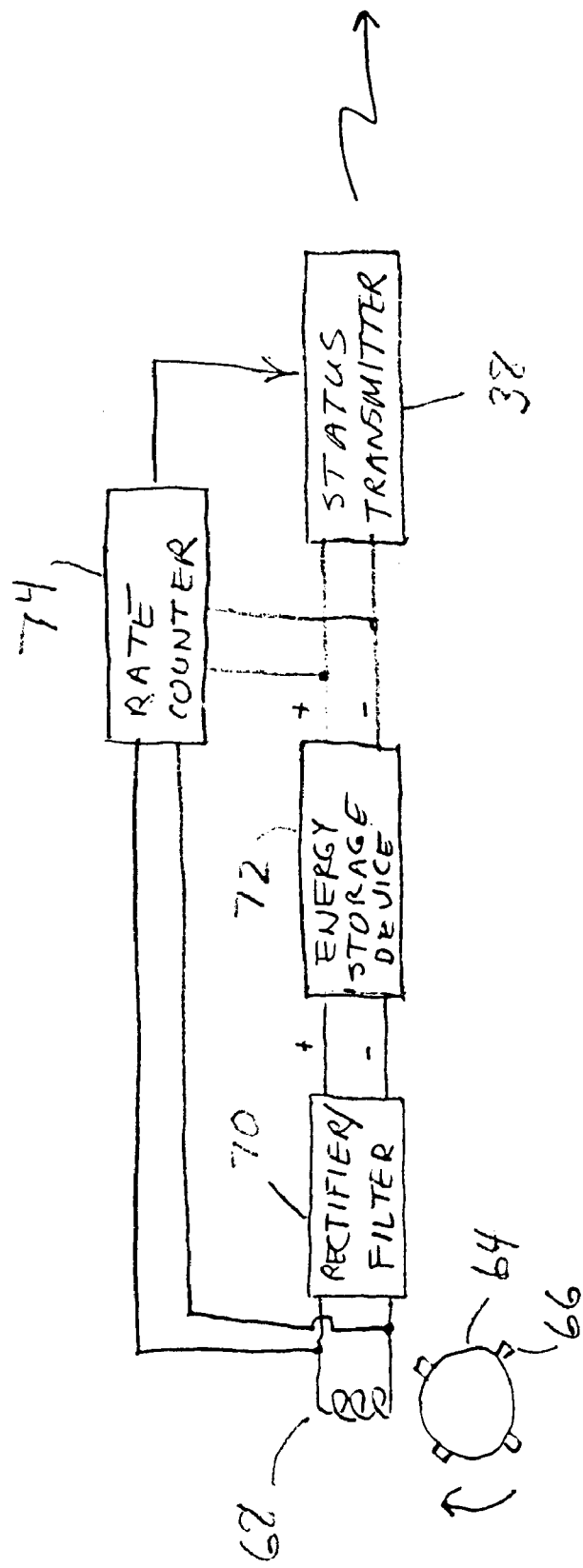
FIG. 5 is a block diagram of a status signal generator, status radio transmitter and power source, wherein the status signal and power are both obtained from a rotating shaft.

Another more specific embodiment of the monitoring device 34 is shown in FIG. 5. In this case, a shaft encoder provides both the status data and the power to transmit it. Thus, a rotating shaft 64, such as the drive axle of a haul truck, has one or more permanent magnets 66 disposed around its periphery so that, as the shaft rotates, it generates current pulses in a coil 68 proximate thereto. The pulses are rectified and filtered by rectifier/filter 70, and the resultant DC output is fed to a rechargeable battery 72, which ensures that there is a constant source of power for the status radio transmitter 38. The pulses are also fed to a rate counter 74, that produces a data signal representative of the speed of shaft rotation and provides that signal to the status radio transmitter.

Figure 6:
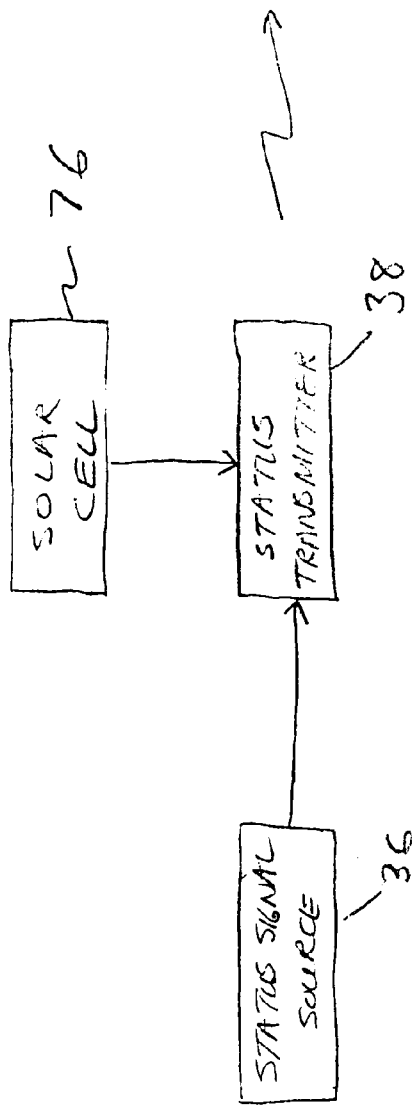
FIG. 6 is a block diagram of a status signal source, status radio transmitter and solar cell power source.

FIG. 6 shows another specific embodiment of the monitoring device 34, wherein the power source is a solar cell 76. Such a device may be mounted on the outside of the cab 18.

Figure 7:
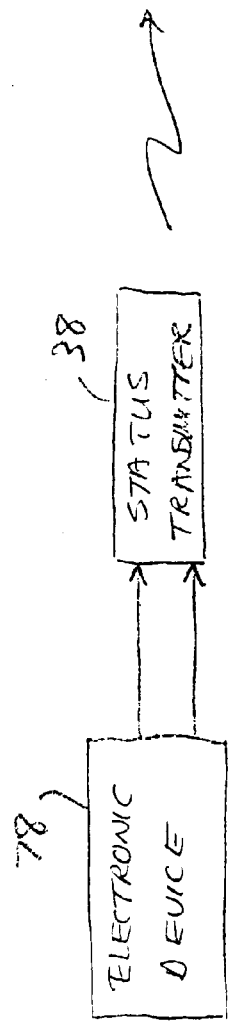
FIG. 7 is a block diagram of a status radio transmitter, status signal source and power source wherein the power is provided by an electronic device which is actually being monitored.

FIG. 7 shows yet another specific monitoring device embodiment, wherein the component of the vehicle whose status is being monitored is an electronic device 78, such as, for example, a thermocouple, which not only provides the status signal to the status radio transmitter 38, but provides the power thereto as well.

It is to be understood that portions of the specific alternative embodiments shown in FIGS. 2 through 7 may be used in various combinations as needed without departing from the principles of the invention. It is also to be understood that the invention is not limited to the specific embodiments of monitoring devices shown in these figures and described herein.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. In a mining vehicle monitoring system having a base radio for communication with mining vehicles having respective vehicle-to-base radios disposed thereon, an intra-vehicle communication system, comprising:

a status signal source, disposed on a given mining vehicle at a location different from the vehicle-to-base radio of said given vehicle, for producing a status signal representing the status of some portion of said given vehicle;

a status radio transmitter, disposed on said given mining vehicle proximate said status signal source, for receiving said status signal and transmitting an intra-vehicle radio signal representative of said status;

a localized power source for generating power for said status radio transmitter from mechanical motion of a portion of the mining vehicle; and a status radio receiver, disposed on said given vehicle proximate the vehicle-to-base radio of said given vehicle, for receiving said intra-vehicle radio signal and providing to the vehicle-to-base radio of said given mining vehicle a signal representing a status.

2. The communication system of claim 1, wherein, based on said signal representing said status, the vehicle-to-base radio of said given mining vehicle transmits to said base radio a radio signal representing said status.

3. The communication system of claim 2, wherein said base radio is adapted to transmit an interrogation radio signal to said given mining vehicle-to-base radio in response to which said vehicle-to-base radio transmits to said base radio said radio signal representing said status.

4. The communication system of claim 1, wherein said status radio transmitter and said status radio receiver operate in the microwave frequency band.

5. The communication system of claim 4, wherein the vehicle-to-base radio of said given vehicle and the base station radio operate in the microwave frequency band, at frequencies different from the frequencies of said status radio transmitter and status radio receiver.

6. The communication system of claim 1, wherein said localized power source derives localized power from said status signal source.

7. In a mining vehicle monitoring system having a base radio for communication with mining vehicles having respective vehicle-to-base radios disposed thereon, an intra-vehicle communication system, comprising:

a status signal source, disposed on a given mining vehicle at a location different from the vehicle-to-base radio of said given vehicle, for producing a status signal representing the status of some portion of said given vehicle, wherein said status signal source includes an electrical power generator for generating power for said status radio transmitter from mechanical motion of a portion of said given mining vehicle;

a status radio transmitter, disposed on said given mining vehicle proximate said status signal source, for receiving said status signal and transmitting an intra-vehicle radio signal representative of said status;

a power source for said status radio transmitter;

a status radio receiver, disposed on said given vehicle proximate the vehicle-to-base base radio of said given vehicle, for receiving said intra-vehicle radio signal and providing to the vehicle-to-base radio of said given mining vehicle a signal representing said status; and a shaft encoder for producing electrical pulses representing the angular velocity of a rotatable shaft of said given mining vehicle, said pulses providing said status signal and the electrical power for said status radio transmitter.

8. A method for monitoring the status of a portion of a mining vehicle, comprising the steps of:

providing a base radio for communicating with said mining vehicle;

providing a vehicle-to-base radio disposed on said mining vehicle for communicating with said base radio;

providing a status signal source, disposed on said mining vehicle at a location different from said vehicle-to-base radio, for producing a status signal representing the status of some portion of said mining vehicle;

providing a status radio transmitter, disposed on said mining vehicle proximate said status signal source, for receiving said status signal and transmitting an intra-vehicle radio signal representative of said status;

providing a localized power sourcer for generating power for said status radio tramsmitter mechanical motion of a portion of the mining vehicle; and providing a status radio receiver, disposed on said given vehicle proximate the vehicle-to-base radio, of said given vehicle, for receiving said intra-vehicle radio signal and providing to said vehicle-to base radio signal representing said status.

9. The method of claim 8, wherein, based on said electrical signal representing said status, the vehicle-to-base radio of said given mining vehicle transmits to said base radio a radio signal representing said status.

10. The method of claim 9, wherein said base radio transmits an interrogation radio signal to said given mining vehicle-to-base radio in response to which said vehicle-to-base radio transmits to said base radio said radio signal representing said status.

11. The method of claim 8, further comprising operating said status radio transmitter and said status radio receiver in the microwave frequency band.

12. The method of claim 11, further comprising operating the vehicle-to-base radio of said given vehicle and the base station radio in the microwave frequency band, at frequencies different from the frequencies of said status radio transmitter and status radio receiver.

13. The method of claim 8, further comprising deriving power for said localized power source from said status signal source.

14. A method for monitoring the status of a portion of a mining vehicle, comprising the steps of:

providing a base radio for communicating with said mining vehicle;

providing a vehicle-to-base radio disposed on said mining vehicle for communicating with said base radio;

providing a status signal source, disposed on said mining vehicle at a location different from said vehicle-to-base radio, for producing a status signal representing the status of some portion of said mining vehicle;

providing a status radio transmitter, disposed on said mining vehicle proximate said status signal source, for receiving said status signal and transmitting an intra-vehicle radio signal representative of said status;

providing a power source for said status radio transmitter;

providing a status radio receiver, disposed on said given vehicle proximate said vehicle-to-base radio, for receiving said intra-vehicle radio signal and providing to said vehicle-to-base radio a signal representing said status;

deriving power for said localized power source from said status signal source; and providing a shaft encoder for producing electrical pulses representing the angular velocity of a rotatable shaft of said mining vehicle, said pulses providing said status signal and the electrical power for said status radio transmitter.

* * * * *